(12) United States Patent
Home

(10) Patent No.: US 10,512,360 B2
(45) Date of Patent: Dec. 24, 2019

(54) TEMPERATURE HOMOGENIZATION, PROTECTION, AND GREASE GUIDE STRUCTURE OF BARBECUE GRILL

(71) Applicant: GRAND HALL ENTERPRISE CO., LTD., Taipei (TW)

(72) Inventor: William Home, Taipei (TW)

(73) Assignee: GRAND HALL ENTERPRISE CO., LTD., Taipei (TW)

(*) Notice: Subject to any disclaimer, the term of this patent is extended or adjusted under 35 U.S.C. 154(b) by 316 days.

(21) Appl. No.: 15/480,359

(22) Filed: Apr. 5, 2017

(65) Prior Publication Data

US 2018/0289215 A1    Oct. 11, 2018

(51) Int. Cl.
*A47J 37/04* (2006.01)
*A47J 37/07* (2006.01)

(52) U.S. Cl.
CPC ................. *A47J 37/0709* (2013.01)

(58) Field of Classification Search
CPC .............................................. A47J 37/04–049
USPC .... 219/422–425, 446–450; 126/25 R, 29, 30
See application file for complete search history.

(56) References Cited

U.S. PATENT DOCUMENTS

| 5,259,299 | A  | * | 11/1993 | Ferraro  | A47J 37/0713 99/340 |
| 6,260,478 | B1 | * | 7/2001  | Harneit  | A47J 37/067 99/400 |
| 8,234,973 | B1 | * | 8/2012  | Rhee     | A47J 37/0786 99/444 |
| 8,985,092 | B2 | * | 3/2015  | Ahmed    | A47J 37/0682 126/39 E |
| 9,554,671 | B2 | * | 1/2017  | Poon     | A47J 37/0694 |
| 10,034,577| B2 | * | 7/2018  | Ahmed    | A47J 37/0682 |
| 2012/0132190 | A1 | * | 5/2012 | Home | A47J 37/0694 126/25 R |
| 2012/0266856 | A1 | * | 10/2012 | Zelek | A47J 37/067 126/25 R |
| 2014/0216436 | A1 | * | 8/2014 | George | A47J 37/0694 126/25 R |

* cited by examiner

*Primary Examiner* — Michael A Laflame, Jr.
(74) *Attorney, Agent, or Firm* — Leong C. Lei

(57) ABSTRACT

Disclosed is a temperature homogenization, protection, and grease guide structure of a barbecue grill, including at least one burner, a grate, and a grease guide and temperature barrier board. The burner includes a heat generation section and is arranged in an inclined, upward-facing manner in a barbecue grill. The grate is arranged in a top opening of the barbecue grill. The grate includes ribs that are provided with at least one temperature homogenization protection section, which is located above and corresponds to the heat generation section. The grease guide and temperature barrier board is configured in an M-shape and is arranged below the burner.

5 Claims, 2 Drawing Sheets

TEMPERATURE HOMOGENIZATION, PROTECTION, AND GREASE GUIDE STRUCTURE OF BARBECUE GRILL

(a) TECHNICAL FIELD OF THE INVENTION

The present invention relates generally to a temperature homogenization, protection, and grease guide structure in the technology field of barbecue grills and roasters, and more particularly to a structure that comprises a temperature homogenization protection section and is provided with an inclined, upward-facing arrangement of a burner and an M-shaped grease guide and temperature barrier board so that the structure, as a whole, helps homogenize a grilling temperature, provides protection to the burner, and also prevents liquids, such as grease/fat of grilled food, meat juice, and sauce, from dropping onto the burner, and conducts, in a more effective manner, grease to a grease tray.

(b) DESCRIPTION OF THE PRIOR ART

Grilling and roasting are a common activity of modern people for they provided food cooked with different styles for people to enjoy and also serve as a social process of enhancing friendship and social communication.

Grilling or roasting is often conducted with a grill. The way, as well as a grate structure, that a conventional barbecue grill takes to grill or barbecue food is such that a grate is placed on an opening formed in a top of the grill and charcoal is filled in the grill for burning and flaming or a burner (such as infrared heater) is used. Food is placed on the grate for heating and cooking. The charcoal flaming or burner used in the conventional grill is arranged to directly face and irradiate thermal energy toward the grate in order to heat and cook food. The charcoal flaming or burner is set to directly face openings or slots of the grate that is placed above the flaming or burner so that a large amount of liquid of grilled food, such as sauce or grease/fat or juice of meat that is being grilled, may directly fall, in a vertical direction, onto the charcoal flaming or the burner during the grilling process. This leads to a large amount of thick smoke, which affects air quality and contaminate the food, and is also harmful to human bodies.

Further, it is also available for burners used as a heat source in a barbecue grill to cook food that a barbecue grid is placed on the opening formed in a top of the barbecue grill and a protection hood, in the form of an inverted V-shape, is provided inside the barbecue grill at a location above the burner. During grilling food, the protection hood provide shielding such that liquids, such as grease/fat of food, juice of meat, and sauce, will fall onto the protection hood and are prevented from dropping onto the burner to cause situations, such as catching a fire or inducing acidic/basic corrosion. However, such a known structure of barbecue grill suffers at least the following shortcomings:

(1) Due to the slots or opening formed between ribs or bars of the barbecue grate, the transmission and distribution of heating barbecue temperature is generally not uniform and is not homogenized such that food cannot be uniformly and evenly heated and cooked, affecting the taste and flavor of food so grilled.

(2) Although a protection hood is provided above the burners, since the conventional protection hood is generally provided with no openings, radiation heat that emits and irradiates from the upper side of the burner cannot be directly applied to the barbecue grate so that waste of thermal energy results and manufacturing cost of the grill is increased.

(3) Although the protection hood is provided to prevent liquids, such as grease/fat of food, juice of meat, and sauce, from directly dropping onto the burner, the protection hood itself is also heated by the radiation energy of the burner during a process of grilling food such that the liquids of food grease/fat, meat juice, and sauce that drop onto the protection hood also catch a fire on the protection hood and similarly generate a large amount of smoke.

(4) The V-shaped protection hood is arranged above the burner and is thus set at a relatively high location, so that liquids, such as grease/fat, meat juice, and sauce, are hard to drop onto a grease tray arranged thereunder.

Thus, the conventional structure of barbecue grill, as discussed above, when used for barbecuing or roasting or grilling food with a barbecue grill, does not achieve an effect of temperature homogenization and protection and does not provide an efficacy of true smoke-free grilling. Further, the protection hood is also not in a perfect condition. Thus, further improvement is necessary.

In view of the above, the present invention aims to provide a solution that helps overcome the above discussed drawbacks and shortcomings of the prior art.

SUMMARY OF THE INVENTION

The primary objective of the present invention is to provide a temperature homogenization, protection, and grease guide structure of a barbecue grill, which comprises a temperature homogenization protection section and is provided with an inclined, upward-facing arrangement of a burner and an M-shaped grease guide and temperature barrier board so that the structure, as a whole, helps homogenize a grilling temperature, provides protection to the burner, and also prevents liquids, such as grease/fat of grilled food, meat juice, and sauce, from dropping onto the burner, and conducts, in a more effective manner, grease to a grease tray.

To achieve the above objective, the present invention is provided for being applicable to a barbecue grill. The present invention comprises at least one burner, a grate, and a grease guide and temperature barrier board, wherein the burner comprises a heat generation section and is arranged in an inclined, upward-facing manner in a barbecue grill. The grate is arranged in a top opening of the barbecue grill, and the grate comprises a plurality of ribs. The ribs define therebetween a plurality of openings. The ribs are provided with at least one temperature homogenization protection section, and the temperature homogenization protection section is arranged above and corresponding to the heat generation section. The grease guide and temperature barrier board is configured in an M-shape. The grease guide and temperature barrier board is arranged in the barbecue grill and located under the burner.

As such, the temperature homogenization protection section so provided, as well as the inclined, upward-facing arrangement of the burner and the M-shaped grease guide and temperature barrier board, help homogenize the grilling temperature, protect the burner, and effectively guide and conduct away grease.

Beneficial efficacies of the present invention are as follows:

(1) The temperature homogenization protection section provides a temperature homogenization protection zone in the grate to help uniformly distribute convective temperature above the upward-facing and inclinedly arranged burners and prevents liquids, such as grease/fat of food being grilled, juice of meat, and sauce, from dropping down onto the burners to potentially catch a fire or generate smoke.

(2) The burners are arranged in an inclined and upward facing manner so as to face the bottom of the grate in an inclined manner, allowing thermal energy, such as infrared thermal energy, emitting from the burners to be transmitted in a direction toward the grate located on the top side thereof and also toward spaces above and around the grate to improve performance of grilling.

(3) The M-shaped grease guide and temperature barrier board, as compared to the conventional inverted V-shaped protection hood, is more effective in guiding liquids, such as grease/fat, meat juice, and sauce, to drop down onto a grease tray located on the under side and, in addition, the grease guide and temperature barrier board is set at a location of a reduced height so as to effectively reduce the temperature of the grease guide and temperature barrier board, making it difficult for grease attaching to the grease guide and temperature barrier board to catch fire.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
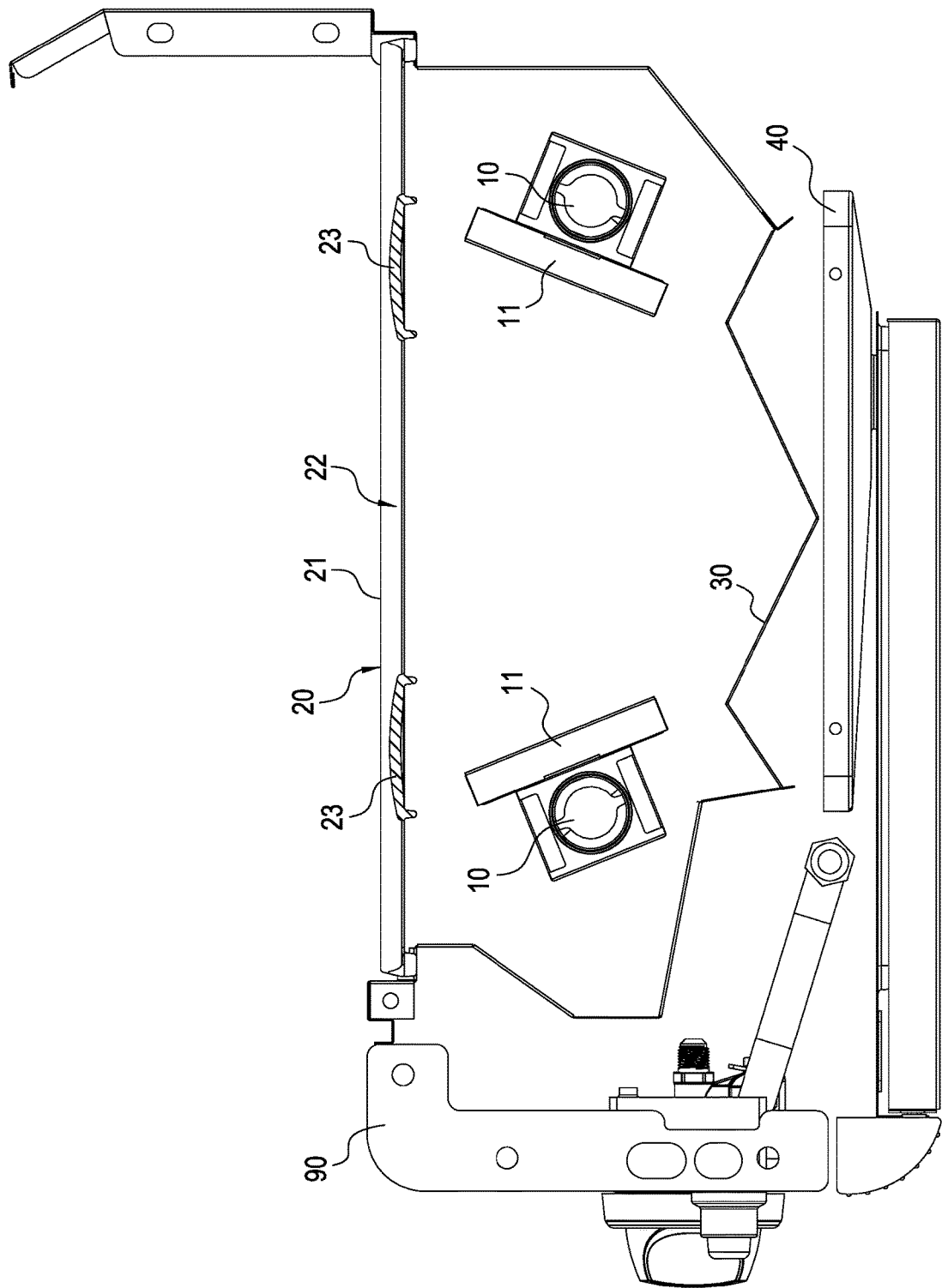
FIG. 1 is a cross-sectional view of the present invention.

Referring to FIG. 1, the present invention is applicable to a barbecue grill 90, and a preferred embodiment of the present invention comprises two burners 10, a grate 20, and a grease guide and temperature barrier board 30. Details will be provided below:

The burners 10 each comprise a heat generation section 11 and are arranged, in an inclined, upward-facing manner, in the barbecue grill 90.

The grate 20 is arranged in a top opening of the barbecue grill 90. The grate 20 comprises a plurality of ribs 21, and the ribs 21 define therebetween a plurality of openings 22. The ribs 21 are provided with at least one temperature homogenization protection section 23, and two being provided in this embodiment. The temperature homogenization protection sections 23 are arranged above and correspond respectively to the heat generation sections 11.

The grease guide and temperature barrier board 30 is configured in the form of an M-shape. The grease guide and temperature barrier board 30 is arranged in the barbecue grill 90 and located below the burners 10.

In an embodiment, two such burners 10 are included and the heat generation sections 11 are arranged, in a manner of being opposite to each other, to face a middle of the barbecue grill 90.

In an embodiment, the temperature homogenization protection sections 23 of the grate 20 are arranged in two opposite side zones of the grate 20.

In an embodiment, the temperature homogenization protection sections 23 of the grate 20 are arranged on a bottom of the ribs 21 and shield a portion of the openings 22 of the grate 20 such that an entire surface of a bottom of each of the temperature homogenization protection sections 23 is allowed to directly receive radiation thermal energy emitting from the burner 10 to thereby enhance performance of homogenization of grilling temperature.

In an embodiment, the burners 10 are infrared heaters.

Figure 2:
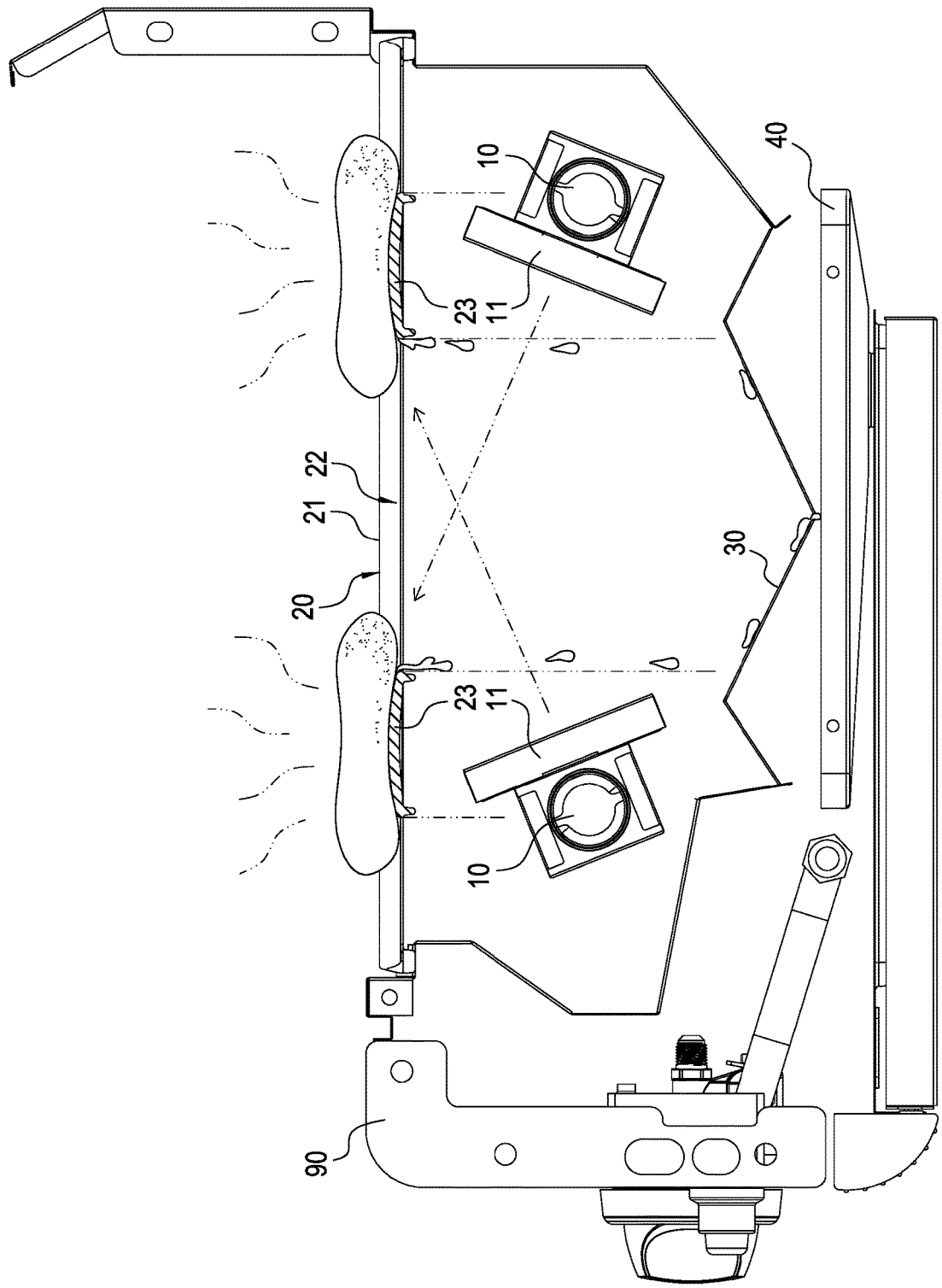
FIG. 2 is a cross-sectional view showing an example demonstrating a use of the present invention.

Referring to FIGS. 1 and 2, in an embodiment, the temperature homogenization protection sections 23 of the grate 20 are each configured with a top surface that is curved, in an upward convex form, to facilitate guide grease of grilled food to flow toward two opposite sides of the temperature homogenization protection section 23.

The temperature homogenization protection sections 23 of the grate 20 are each provided, on two opposite side edges thereof, with ribs that extend downward therefrom to guide the grease of the grilled food to flow downward along the ribs to drop down therefrom so as to prevent the grease of the grilled food from flowing to bottoms of the temperature homogenization protection section 23 and dropping down onto the heat generation section 11.

The above provides a description to the components/parts of the present invention, as well as assembly thereof, and an example of use, features, and advantages of the present invention will be provided below.

Referring to FIG. 2, the present invention is structured such that the temperature homogenization protection sections 23, together with the burners 10 being arranged in an inclined and upward facing manner and an M-shaped grease guide and temperature barrier board 30 being included, are provided to help homogenize the grilling temperature, protect the burners 10, and effectively guide and conduct away grease.

Beneficial efficacies of the present invention are as follows:

(1) The temperature homogenization protection section 23 provides a temperature homogenization protection zone in the grate 20 to help uniformly distribute convective temperature above the upward-facing and inclinedly arranged burners 10 and prevents liquids, such as grease/fat of food being grilled, juice of meat, and sauce, from dropping down onto the burners 10 to potentially catch a fire or generate smoke.

(2) The burners 10 are arranged in an inclined and upward facing manner so as to face the bottom of the grate 20 in an inclined manner, allowing thermal energy, such as infrared thermal energy, emitting from the burners 10 to be transmitted in a direction toward the grate 20 located on the top side thereof and also toward spaces above and around the grate 20 to improve performance of grilling.

(3) The M-shaped grease guide and temperature barrier board 30, as compared to the conventional inverted V-shaped protection hood, is more effective in guiding liquids, such as grease/fat, meat juice, and sauce, to drop down onto a grease tray 40 located on the under side and, in addition, the grease guide and temperature barrier board 30 is set at a location of a reduced height so as to effectively reduce the temperature of the grease guide and temperature barrier board 30, making it difficult for grease attaching to the grease guide and temperature barrier board 30 to catch fire.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A temperature homogenization, protection, and grease guide structure of a barbecue grill, comprising:
    at least one burner, which comprises a heat generation section and is arranged in an inclined, upward-facing manner in a barbecue grill;
    a grate, which is arranged in a top opening of the barbecue grill, the grate comprising a plurality of ribs, the ribs defining therebetween a plurality of openings, the ribs being provided with at least one temperature homogenization protection section, the temperature homogenization protection section being arranged above and corresponding to the heat generation section to shield a portion of the openings in order to uniformly distribute convection temperature caused by the heat generation section, wherein the temperature homogenization protection section has two opposite side edges and ribs extending downward from an undersurface of the temperature homogenization layer at locations adjacent to and inwardly shifted from the two opposite side edges; and
    a grease guide and temperature barrier board, which is configured in an M-shape, the grease guide and temperature barrier board being arranged in the barbecue grill and located under the burner to guide the grease of the grilled food to drop down onto a grease tray located on the underside thereof;
    wherein the burner comprises an infrared heater and the temperature homogenization protection section is arranged above and corresponding to the infrared heater such that an entire surface of a bottom of the temperature homogenization protection section is allowed to directly receive radiation thermal energy emitting from the infrared heater to thereby enhance homogenization of grilling temperature.

2. The temperature homogenization, protection, and grease guide structure of the barbecue grill according to claim 1, wherein the at least one burner comprises two burners such that two heat generation sections of the two burners are arranged, in a manner of being opposite to each other, to face a middle of the barbecue grill.

3. The temperature homogenization, protection, and grease guide structure of the barbecue grill according to claim 1, wherein the temperature homogenization protection section of the grate is arranged in two opposite side zones of the grate.

4. The temperature homogenization, protection, and grease guide structure of the barbecue grill according to claim 1, wherein the temperature homogenization protection section of the grate is arranged on a bottom of the ribs and shields a portion of the openings of the grate.

5. The temperature homogenization, protection, and grease guide structure of the barbecue grill according to claim 1, wherein the temperature homogenization protection section of the grate has a top that is curved.

\* \* \* \* \*